United States Patent
Savir et al.

(10) Patent No.: US 10,694,002 B1
(45) Date of Patent: Jun. 23, 2020

(54) DATA COMPRESSION OPTIMIZATION BASED ON CLIENT CLUSTERS

(71) Applicant: EMC IP Holding Company LLC, Hopkinton, MA (US)

(72) Inventors: Amihai Savir, Sansana (IL); Idan Levy, Kadima-Zoran (IL); Shai Harmelin, Herzliya (IL); Shiri Gaber, Herzliya (IL); Oshry Ben-Harush, Kibbutz Galon (IL); Avitan Gefen, Herzliya (IL)

(73) Assignee: EMC IP Holding Company LLC, Hopkinton, MA (US)

(*) Notice: Subject to any disclaimer, the term of this patent is extended or adjusted under 35 U.S.C. 154(b) by 267 days.

(21) Appl. No.: 15/498,995

(22) Filed: Apr. 27, 2017

(51) Int. Cl.
| | |
|---|---|
| *H04L 29/06* | (2006.01) |
| *H04L 12/26* | (2006.01) |
| *G06F 9/455* | (2018.01) |
| *H04L 12/18* | (2006.01) |
| *G06F 9/30* | (2018.01) |

(52) U.S. Cl.
CPC .............. *H04L 69/04* (2013.01); *H04L 43/16* (2013.01); *H04L 67/42* (2013.01); *G06F 9/30156* (2013.01); *G06F 9/45558* (2013.01); *H04L 12/1895* (2013.01)

(58) Field of Classification Search
CPC . H04L 69/04; H04L 29/0604; H04L 67/2828; G06F 9/30178
See application file for complete search history.

(56) References Cited

U.S. PATENT DOCUMENTS

| | | | | |
|---|---|---|---|---|
| 2002/0080871 | A1* | 6/2002 | Fallon | H04L 12/1895 375/240 |
| 2010/0223237 | A1* | 9/2010 | Mishra | G06F 9/30156 707/693 |
| 2011/0199243 | A1* | 8/2011 | Fallon | H04L 12/1895 341/60 |
| 2012/0210068 | A1* | 8/2012 | Joshi | G06F 9/45558 711/122 |
| 2014/0195498 | A1* | 7/2014 | Asher | H03M 7/6088 707/693 |
| 2015/0063350 | A1* | 3/2015 | Sundaram | G06F 16/1744 370/389 |
| 2016/0182409 | A1* | 6/2016 | Kraemer | H04L 49/9057 370/417 |
| 2017/0090776 | A1* | 3/2017 | Kowles | G06F 3/0608 |

* cited by examiner

*Primary Examiner* — Barbara B Anyan
(74) *Attorney, Agent, or Firm* — Dergosits & Noah LLP

(57) ABSTRACT

Data compression optimization based on client clusters is described. A system identifies a cluster of similar client devices in a group of client devices, by comparing data compression factors that correspond to each client device in the group of client devices. The system identifies a relationship between data compression factors corresponding to the cluster and data compression ratios corresponding to the cluster. The system identifies a client device, in the cluster, which corresponds to a data compression ratio that is inefficient relative to other compression ratios corresponding to other client devices in the cluster. The system outputs a data compression recommendation for the client device, based on data compression factors corresponding to the client device and the identified relationship between the data compression factors corresponding to the cluster and the data compression ratios corresponding to the cluster.

20 Claims, 6 Drawing Sheets

DATA COMPRESSION OPTIMIZATION BASED ON CLIENT CLUSTERS

BACKGROUND

Enterprises generate and store increasingly vast amounts of data. Techniques used to store these vast amounts of data include data compression, which is a procedure that encodes information using less storage space than the original representation. An example of a data compression technique is data deduplication, which reduces storage needs and network transfer size by eliminating duplicate copies of repeating data. When data compression is implemented, the performance depends on many data compression factors such as the amount of stored data, the types of stored data, the ages of stored data, the compression method used for stored data, the operating systems for the stored data, the software applications for stored data, the hardware that stores the data, the size of the enterprise that stores data, the geographical locations that store data, and the client/server side of compression of stored data. Since an enterprise may use many client devices that store data that is compressed based on many different data compression factors, no single optimized set of data compression factors can serve as a standard that should be implemented by every client device or collection of client devices.

A backup/restore application is one example in which data stored by a client device is de-duplicated. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. Data deduplication significantly reduces backup time by only storing unique periodic changes, while maintaining full backups for restoration. The transmission of a de-duplicated backup sends only changed data, thereby reducing network traffic. When the data protection administrator decides to return a data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

Figure 1:
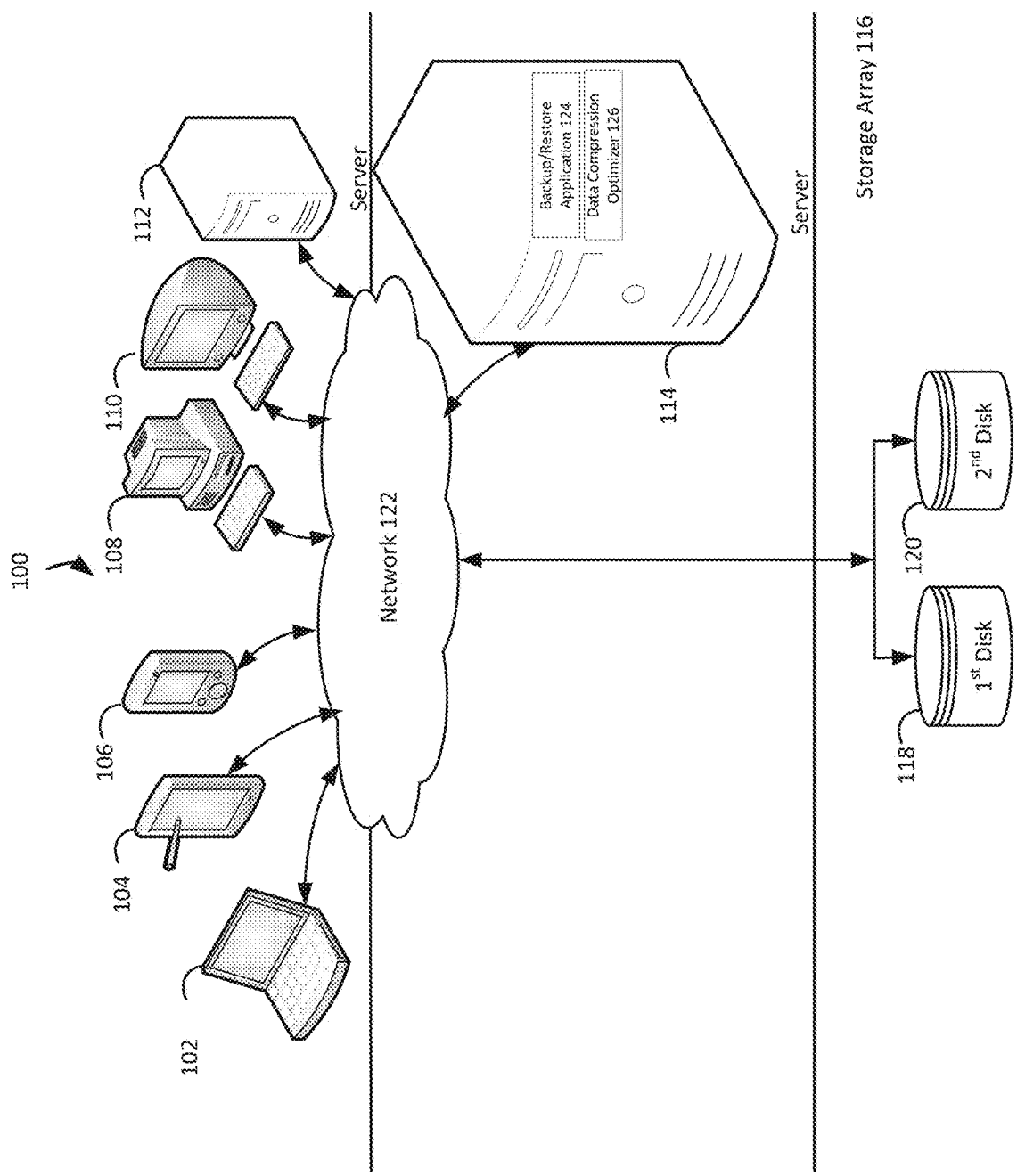
FIG. 1 illustrates a block diagram of a simplified example system for data compression optimization based on client clusters, under an embodiment.

An enterprise may not even be aware of any of its client devices' data compression performances unless serious problems occur or a client device's data compression performance is extremely inefficient, much less systematically evaluate the quality of its client devices' data compression performances. The challenges of optimizing the data compression for a specific client device arise from the many different data compression factors that influence its data compression performance.

Embodiments herein provide data compression optimization based on client clusters. A system identifies a cluster of similar client devices in a group of client devices, by comparing data compression factors that correspond to each client device in the group of client devices. The system identifies a relationship between data compression factors corresponding to the cluster and data compression ratios corresponding to the cluster. The system identifies a client device, in the cluster, which corresponds to a data compression ratio that is inefficient relative to other compression ratios corresponding to other client devices in the cluster. The system outputs a data compression recommendation for the client device, based on data compression factors corresponding to the client device and the identified relationship between the data compression factors corresponding to the cluster and the data compression ratios corresponding to the cluster.

For a simplified example, a data compression optimizer applies a clustering algorithm to all of the clients protected by a data protection service, and identifies a cluster of similar client devices that include a laptop, a tablet, and a smartphone, because each of these client devices store less than 10 gigabytes (GB) of data as 1 or 2 data types, while the rest of the clients store more than 250 gigabytes of data as 3 or 4 data types. The data compression optimizer identifies a strong correlation between the cluster's number of a types and the cluster's data compression ratios. The data compression optimizer identifies the laptop as having a data compression ratio that is 1 standard deviation from than the average compression ratios of the similar client devices. The data compression optimizer outputs a recommendation for a system administrator to use the laptop to store only 1 data type instead of 2 data types, based on the strong correlation between the cluster's number of data types and the cluster's data compression ratios. Although the system administrator had not been aware of the laptop's inefficient data compression performance, the data compression optimizer's recommendation enabled the system administrator to easily improve the laptop's data compression performance by storing only 1 data type on the laptop. In this simplified example, the data compression optimizer identifies an inefficient data compression performance for only a single client device, and outputs a recommendation to optimize the data compression performance for only a single client device. However, the data compression optimizer may identify inefficient data compression performances for any collection of client devices that store data to common storage and/or any number of client devices, and output a recommendation to optimize the data compression performance for any collection of client devices that store data to common storage and/or for any number of client devices.

FIG. 1 illustrates a diagram of a simplified example of a system that implements data compression optimization based on client clusters, under an embodiment. As shown in FIG. 1, a system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client device 102, a second client device 104, a third client device 106, a fourth client device 108, a fifth client device 110, and a sixth client device 112; and a server 114 and a storage array 116 that may be provided by a hosting company. Although FIG. 1 depicts the first client 102 as a laptop computer 102, the second client 104 as a tablet computer 104, the third client 106 as a smartphone 106, the fourth client 108 as a personal computer 108, the fifth client 110 as an iMac computer 110, and the sixth client 112 as a server 112, each of the clients 102-112 may be any type of computer. The storage array 116 includes a first disk 118 and a second disk 120. The clients 102-112, the server 114, and the storage array 116 communicate via a network 122. Although FIG. 1 depicts the system 100 with six clients 102-112, one server 114, one storage array 116, two disks 118-120, and one network 122, the system 100 may include any number of clients 102-112, any number of servers 114, any number of storage arrays 116, any number of disks 118-120, and any number of networks 122. The clients 102-112 and the server 114 may each be substantially similar to the system 600 depicted in FIG. 6 and described below.

The server 114 includes a backup/restore application 124 that creates backup files of data objects for the clients 102-112, and executes a rollback based on the backup files. The backup/restore application 124 provides centralized administration, such as scheduling, monitoring, and managing backup operations and backup files. The backup/restore application 124 enables the storing of backup operation schedules, client policies, and client configurations. The backup/restore application 124 provides a unique interface to the clients 102-112 during login, and assists the server 114 in authenticating and registering the clients 102-112. The backup/restore application 124 sends backup/restore work orders to the clients 102-112, which receive and process the work orders to start a backup or restore operation. The backup/restore application 124 maintains a local database of all processes that execute on the server 114. The backup/restore application 124 executes server-side processes for a system administrator's graphical management console, which may enable the system administrator to use command line interface tools for queries. For example, a system administrator identifies the clients 102-112 registered with the server 114.

The server 114 includes a data compression optimizer 126 that optimizes the compression of data stored by the clients 102-112. The data compression optimizer 126 may be a separate component from the backup/restore application 124 or an integrated module within the backup/restore application 124. Although FIG. 1 depicts the backup/restore application 124 and the data compression optimizer 126 residing completely on the server 114, the backup/restore application 118 and the data compression optimizer 126 may reside in any combination of partially on the server 114 and partially on the clients 102-112. Even though the following paragraphs describe EMC Corporation's Avamar® backup/restore application and EMC Corporation's NetWorker® backup/restore application as examples of the backup/restore application 124, the backup/restore application 124 may be any other backup/restore application which provides the backup/restore functionalities described in the Background section.

The backup/restore application 124 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 124 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

Figure 2:
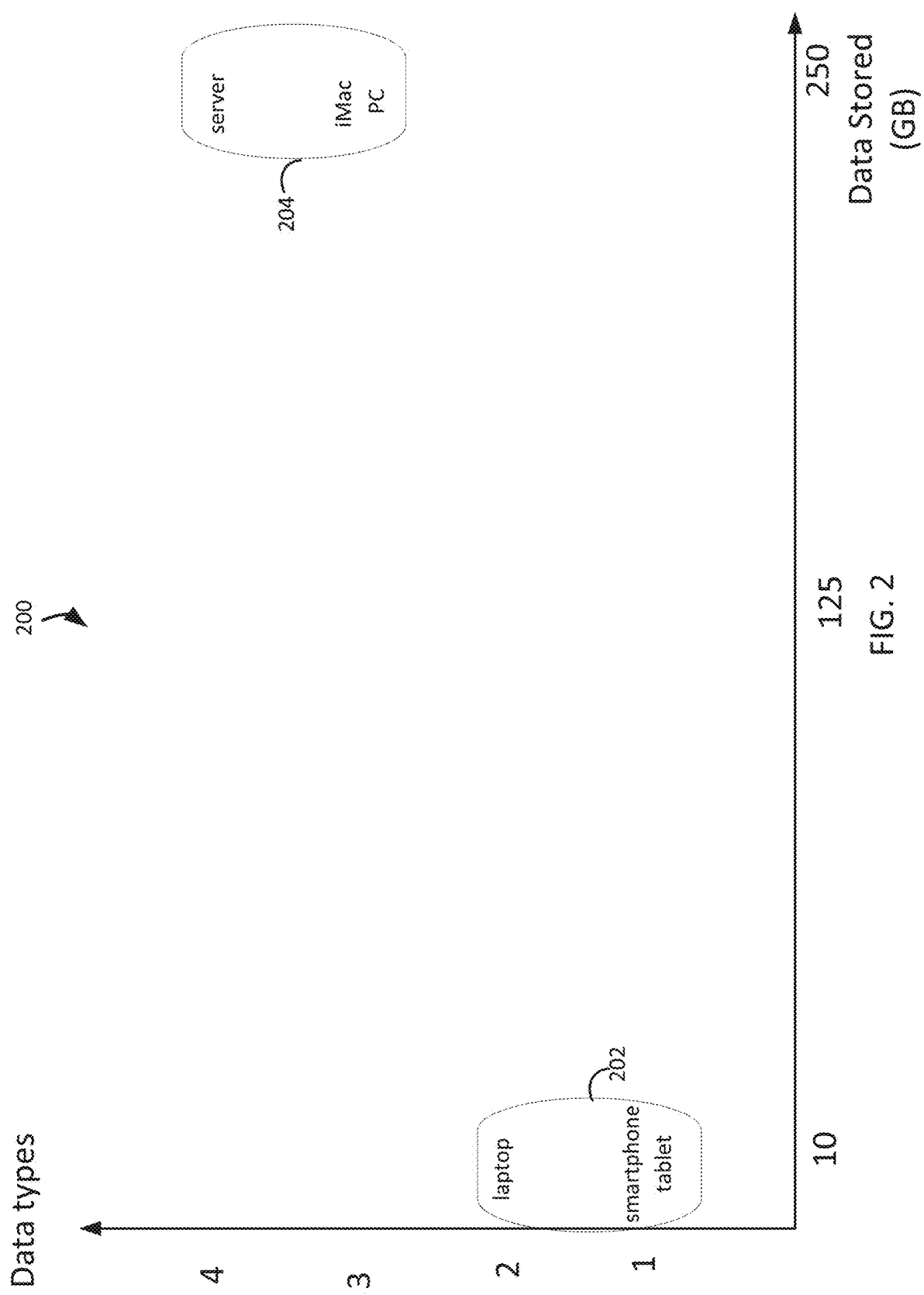
FIG. 2 illustrates a block diagram of a simplified example graph for data compression optimization based on client clusters, under an embodiment.

The system 100 can periodically or occasionally identify data compression factors that correspond to each client device in group of client devices. For example, the data compression optimizer 126 identifies that the laptop 102 stores 9.9 GB of data as the document data type and the image data type, the tablet 104 stores 9.8 GB of data as the document data type, and the smartphone 106 stores 9.7 GB of data as the image data type. Continuing the example, the data compression optimizer 126 also identifies that the personal computer 108 stores 250.1 GB of data as the document data type, the image data type, and the audio data type, the iMac 110 stores 250.2 GB of data as the document data type, the image data type, and the audio data type, and the server 108 stores 250.3 GB of data as the document data type, the image data type, the audio data type, and the video data type. FIG. 2 illustrates a simplified example graph 200 of data compression factors for the clients 102-112, with the vertical axis depicting the number of data types for each of the clients 102-112, and the horizontal axis depicting the amount of stored data in gigabytes (GB) for each of the clients 102-112. Although this simplified example includes only two data compression factors for each client, each client may have any number of data compression factors. The data compression factors may include an amount of data, a type of data, an age of data, a data compression method, an operating system, a software application, hardware, an enterprise size, a geographical location, and a client/server side of data compression.

A data compression factor can be an influence that contributes to a reduction in storage space required for information. A client device can be a computer or workstation that is capable of obtaining information, applications, and/or services from a server. An amount of data can be a quantity of information, expressed in size. A type of data can be a category of information having common characteristics. An age of data can be the length of time that specific information has been stored. A data compression method can be a particular procedure for reducing the storage space required for information. An operating system can be the specific software that supports a computer's basic functions, such as storing data. A software application can be a program, or a part of a program, designed and written to fulfill a particular purpose of a user. Hardware can be the machines, wiring, and other physical components of a computer that stores data. An enterprise size can be a number of people associated with a business, company, project, or undertaking. A geographical location can be a particular physical place where data is stored or from where stored data originated. A client/server side of data compression can be particular location in a computer network where the storage space required for information is reduced.

After identifying the client devices' data compression factors, the system 100 identifies a cluster of similar client devices in a group of client devices, by comparing data compression factors that correspond to each client device in the group of client devices. For example, the data compression optimizer 126 compares the data compression factors for all of the client devices 102-112 protected by a data protection service, and identifies a cluster of similar client devices that include the laptop 102, the tablet 104, and the smartphone 106, because each of these client devices 102-106 store less than 10 gigabytes of data as 1 or 2 data types, while each of the rest of the clients devices 108-112 store more than 250 gigabytes of data as 3 or 4 data types. Continuing this example, the data compression optimizer 126 can also identify another cluster of similar client devices that include the personal computer 108, the iMac 110, and the server 112, because each of these client devices 108-112 store more than 250 gigabytes of data as 3 or 4 data types, while each of the rest of the clients devices 102-106 store less than 10 gigabytes of data as 1 or 2 data types. While these examples describe the group of client devices as protected by a data protection service, the group of client devices may be used by a single enterprise. FIG. 2 depicts a cluster 202 of similar client devices that include the laptop 102, the tablet 104, and the smartphone 106, and another cluster 204 of similar client devices that include the personal computer 108, the iMac 110, and the server 112. Although each these simplified examples of the clusters 202 and 204 include only 3 client devices, the clusters 202 and 204 may include any number of client devices. For example, the data compression optimizer 126 may create a cluster of similar client devices based on the number of similar client devices in the cluster meeting a threshold, such as at least 10 client devices in each cluster. The data compression optimizer 126 may use such a minimum number of client devices to create each cluster to be certain that the cluster is composed of a sufficient number of client devices to accurately identify a usage pattern, thereby avoiding drawing erroneous conclusions from a cluster that is based on a sample size that is too small. A cluster of similar client devices can be computers or workstations that resemble each other without being identical, and that are capable of obtaining information, applications, and/or services from a server.

Identifying a cluster of similar client devices in a group of client devices may include applying a clustering algorithm or a similarity function to each client device in the group of client devices. For example, the data compression optimizer 126 applies a clustering algorithm to all of the client devices 102-112, thereby identifying the cluster 202 of similar client devices that include the laptop 102, the tablet 104, and the smartphone 106. In another example, the data compression optimizer 126 applies a similarity function to each of the client devices 102-112, thereby identifying the cluster 202 of similar client devices that include the laptop 102, the tablet 104, and the smartphone 106. A clustering algorithm can be a process or set of rules followed to identify a group of similar items. Examples of clustering algorithms include k-means clustering and hierarchical clustering, which divide a population of items into different clusters of items which maintain larger similarities inside each cluster compared with similarities to other clusters. A similarity function can be a process that measures items' mutual resemblance. Examples of similarity functions include the Pearson correlation coefficient, the Cosine similarity, and the ordinary least squares coefficient, which generate a score for a specific item, such that the item's score can be compared to other items' scores to identify similar items.

Having identified a cluster, the system 100 identifies a relationship between data compression factors corresponding to the cluster and data compression ratios corresponding to the cluster. For example, the data compression optimizer 126 identifies a direct relationship between the cluster's number of data types and the duster's data compression ratios. Identifying the relationship between the data compression factors corresponding to the cluster and the data compression ratios corresponding to the cluster may include generating a regression model based on the data compression factors corresponding to the cluster and the data compression ratios corresponding to the cluster, or determining a correlation between one of the data compression factors corresponding to the cluster and the data compression ratios corresponding to the cluster. For example, the data compression optimizer 126 generates a regression model based on the cluster's data compression factors and the cluster's data compression ratios. Then the data compression optimizer 126 can use the generated regression model to predict the data compression ratio for each client device based on the client device's current data compression factors and potential future data compression factors. The relative weights of each data compression factor in the regression model represent the importance of each data compression factor (including directionality) in affecting the data compression ratio. The data compression optimizer 126 may select a sufficiently large time frame, such as the most recent month or year, and record an observation for each day for each client device in a cluster.

The following equation is a simplified example of a linear regression model:

$$y=b_0+b_1x_1+b_2x_2+e$$

where y is the response or dependent variable, $x_i$ are the independent or predictors variables, $b_i$ are the regression coefficients, and e is the error term or noise. For the sake of this simplified example, $x_1$ is defined to be data volumes measured in gigabytes, $x_2$ is defined to be data age measured in days, and y is the data compression ratio, which in this simplified example is defined as the data size before compression divided by the data size after compression:

$$y=1+5*data\_volume+7*data\_age+e$$

This simplified numerical example indicates that for a small (close to 0) and new data the data compression ratio will be close to 1, for continuous variables data_volume and data_age, the difference in y is determined for each one unit difference in the variables, and that the bigger and older the data, the better the data compression ratio. The data compression optimizer 126 may display the equation for a regression model to a data protection administrator.

A data compression ratio can be the mathematical relationship between the storage size required for information before a reduction in the storage size and the storage size required for information after the reduction in the storage size. A data compression ratio can be expressed as the data size before compression divided by the data size after compression, in which case a numerically large data compression ratio reflects a more efficient use of data storage, or expressed as the data size after compression divided by the data size before compression, in which case a numerically small data compression ratio reflects a more efficient use of data storage. Since the data compression ratio measures the efficiency of data compression, it can also be referred to as the data compression performance.

Figure 3:
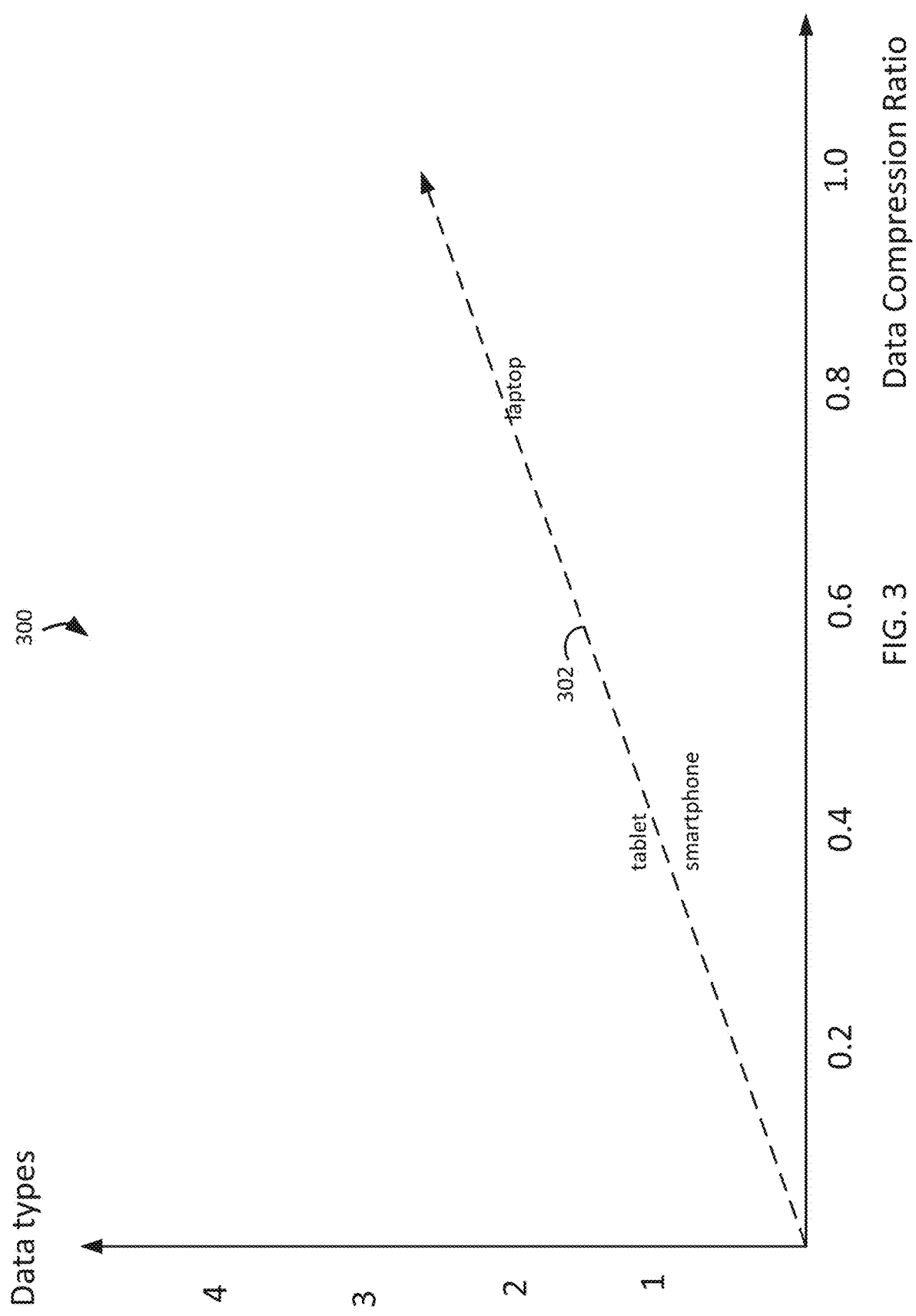
FIG. 3 illustrates a block diagram of another simplified example graph for data compression optimization based on client clusters, under an embodiment.

In another example, the data compression optimizer 126 identifies a strong correlation between the cluster's number of data types and the cluster's data compression ratios. FIG. 3 illustrates a simplified example graph 300 that depicts a relationship between the number of data types for the clients in a cluster, as indicated by the vertical axis, and the data compression ratio for the clients in the cluster, as indicated by the horizontal axis. For the simplified example depicted by FIG. 3, the data compression ratio is the data size after compression divided by the data size before compression, in which case a numerically small data compression ratio reflects a more efficient use of data storage. Consequently, the graph 300 depicts that as the number of data types doubles from 1 to 2, the data compression ratio doubles from an efficient 0.4 to a less efficient 0.8. The graph 300 depicts an approximation 302 of the strong correlation of 1.0 between the number of data types and the data compression ratios. In this simplified example, as the number of data types increases, the data compression ratio or data compression performance becomes proportionally worse. Although FIG. 3 depicts the relationship between only one data compression factor and the data compression ratios, the data compression optimizer 126 may determine the relationship between each data compression factor and the data compression ratios, and display each of these relationships in the form of corresponding figures, similar to FIG. 3, to a data protection administrator. A relationship can be the way in which two or more items are connected. A correlation can be a quantity measuring the extent of interdependence of variable quantities. A regression model can be a representation of an estimated relationship between at least one independent variable and a single dependent variable.

Figure 4:
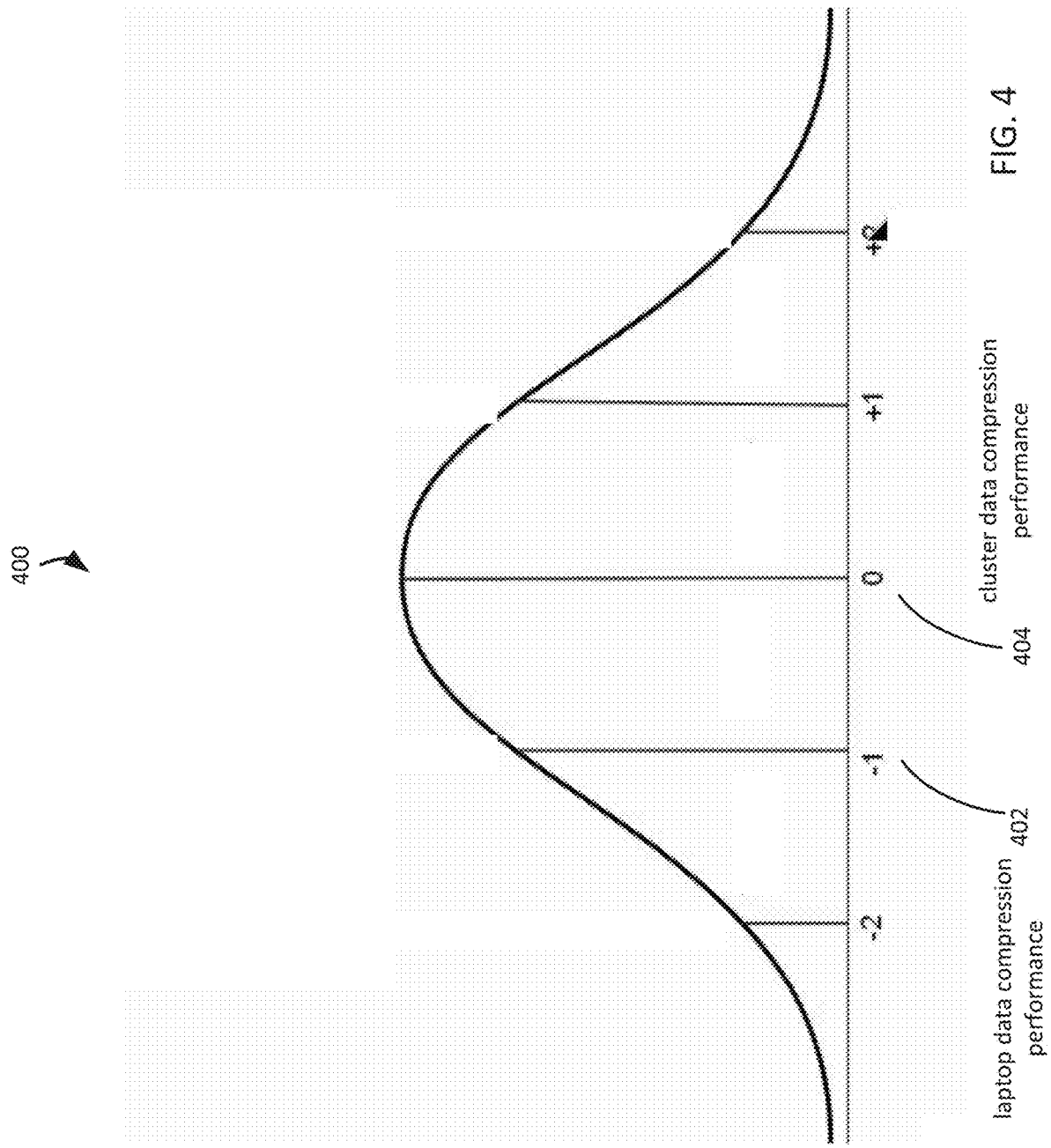
FIG. 4 illustrates a block diagram of yet another simplified example graph for data compression optimization based on client clusters, under an embodiment.

In addition to identifying a relationship between a cluster's data compression factors and data compression ratios, the system 100 identifies a client device, in the cluster, which corresponds to a data compression ratio that is inefficient relative to other compression ratios corresponding to other client devices in the cluster. For example, the data compression optimizer 126 identifies the laptop 102 as having a data compression ratio that is inefficient relative to the compression ratios of similar client devices in the cluster 202, the tablet 104 and the smartphone 106. In this simplified example, the data compression optimizer 126 identifies an inefficient data compression performance for only a single client device, the laptop 102. However, the data compression optimizer 126 may identify inefficient data compression performances for any collection of client devices that store data to common storage and/or for any number of client devices. Identifying a client device, in the cluster, which corresponds to the data compression ratio that is inefficient relative to the other compression ratios corresponding to the other client devices in the cluster may include determining an average value and a standard deviation based on the data compression ratios corresponding to the cluster, and identifying the client device which corresponds to the data compression ratio that is a specified amount of the standard deviation from the average value. For example, the data compression optimizer 126 identifies the laptop 102 as having a data compression ratio that is more than 1 standard deviation from the average compression ratios of the similar client devices in the cluster 202, which also include the tablet 104 and the smartphone 106. FIG. 4 illustrates a simplified example graph 400 that depicts the laptop 102 as having a data compression ratio 402 that is more than 1 standard deviation less than the average compression ratios 404 of the similar client devices in the cluster 202, which include the tablet 104 and the smartphone 106. Although FIG. 4 depicts the use of 1 standard deviation to identify the laptop 102 as having an inefficient data compression performance, the data compression optimizer 126 can use any number of standard deviations, or any measure of variance, to identify an inefficient data compression performance.

Following the identification of a client device with an inefficient data compression ratio, the system 100 outputs a data compression recommendation for the client device, based on data compression factors corresponding to the client device and the identified relationship between the data compression factors corresponding to the cluster and the data compression ratios corresponding to the cluster. For example, the data compression optimizer 126 outputs a recommendation for the system administrator for the laptop 102 to use the laptop 102 to store only 1 data type instead of 2 data types, based on the strong correlation between the cluster's number of data types and the cluster's data compression ratios. Although the system administrator for the laptop 102 had not been aware of the laptop 102's inefficient data compression performance, the data compression optimizer 126's recommendation enabled the system administrator to easily improve the laptop 102's data compression performance by storing only 1 data type on the laptop 102. In this simplified example, the data compression optimizer 126 outputs a recommendation to optimize the data compression performance for only a single client device, the laptop 102. However, the data compression optimizer 126 may output a recommendation to optimize the data compression performance for any collection of client devices that store data to common storage and/or for any number of client devices. In another example, the data compression optimizer 126 outputs a recommendation for changing the version of a client device's operation system and/or hardware to an upgraded version. In yet another example, the data compression optimizer 126 outputs a recommendation for changing the compression method of a client device or adding another compression method to the client side. A data compression recommendation can be a suggestion or proposal as to the best course of action to reduce the storage space required for specific information.

Figure 5:
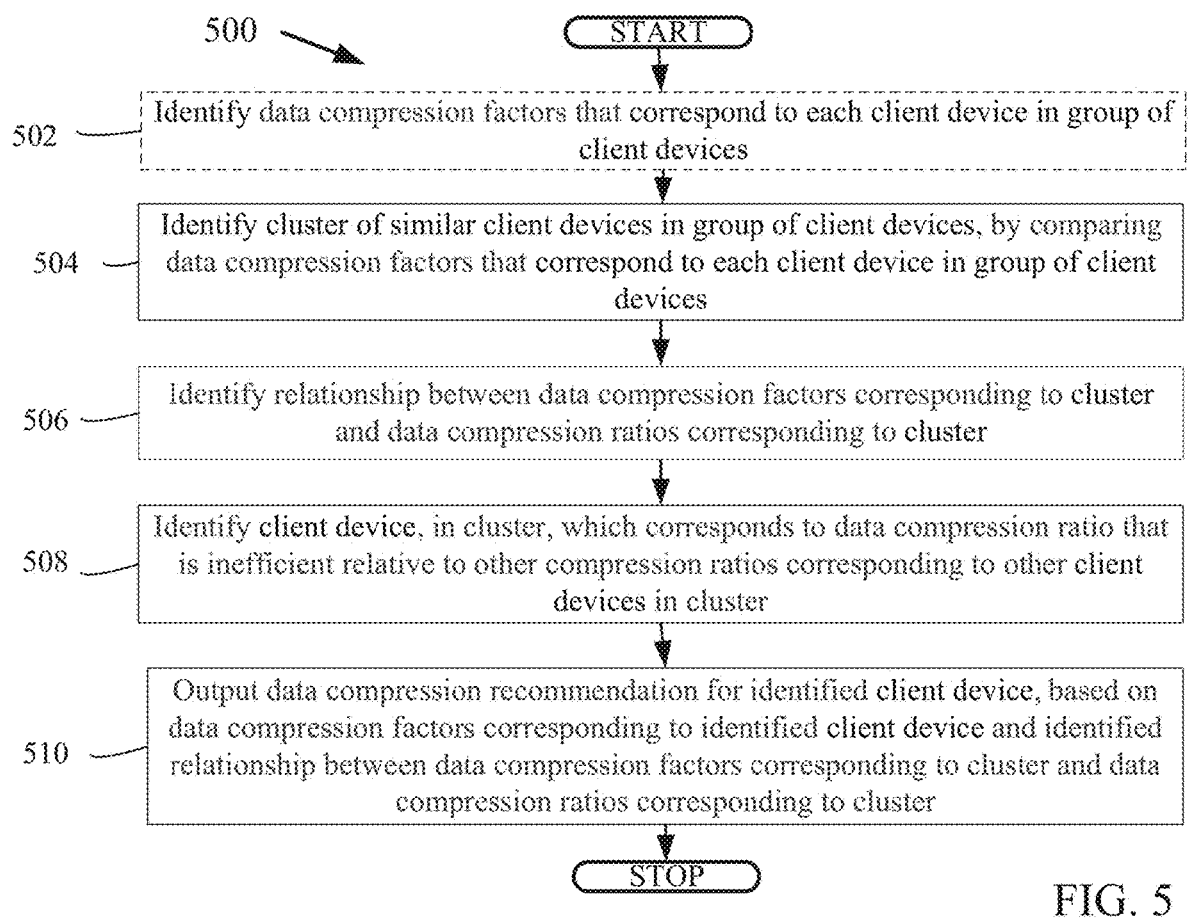
FIG. 5 is a flowchart that illustrates a method of data compression optimization based on client clusters, under an embodiment.

FIG. 5 is a flowchart that illustrates a method for data compression optimization based on client clusters, under an embodiment. Flowchart 500 illustrates method acts illustrated as flowchart blocks for certain steps involved in and/or between the clients 102-112 and/or the server 114 of FIG. 1.

Data compression factors that correspond to each client device in group of client devices are optionally identified, block 502. The system 100 identifies data compression factors that will be used to optimize data compression performance. For example and with limitation, this can include the data compression optimizer 126 identifying that the laptop 102 stores 9.9 GB of data as the document data type and the image data type, the tablet 104 stores 9.8 GB of data as the document data type, and the smartphone 106 stores 9.7 GB of data as the image data type. Continuing the example, the data compression optimizer 126 also identifies the personal computer 108 stores 250.1 GB of data as the document data type, the image data type, and the audio data type, the iMac 110 stores 250.2 GB of data as the document data type, the image data type, and the audio data type, and the server 108 stores 250.3 GB of data as the document data type, the image data type, the audio data type, and the video data type.

After identifying the client devices' data compression factors, a cluster of similar client devices is identified in a group of client devices, by comparing data compression factors that correspond to each client device in the group of client devices, block 504. The system 100 identifies a cluster of client devices, at least one of which will have its data compression performance optimized. By way of example and without limitation, this can include the data compression optimizer 126 applying a clustering algorithm to all of the client devices 102-112, thereby identifying the cluster 202 of similar client devices that include the laptop 102, the tablet 104, and the smartphone 106, because each of these client devices 102-106 store less than 10 gigabytes of data as 1 or 2 data types, while each of the rest of the clients devices 108-112 store more than 250 gigabytes of data as 3 or 4 data types.

Having identified a cluster, a relationship is identified between data compression factors corresponding to the cluster and data compression ratios corresponding to the cluster, block 506. The system 100 identifies relationships to data compression performances, at least one of which will be optimized. In embodiments, this can include the data compression optimizer 126 identifying a strong correlation between the cluster's number of data types and the cluster's data compression ratios.

In addition to identifying a relationship between a cluster's data compression factors and data compression ratios, a client device, in the cluster, is identified which corresponds to a data compression ratio that is inefficient relative to other compression ratios corresponding to other client devices in the cluster, block 508. The system 100 identifies a client device with an inefficient data compression performance that will be optimized. For example and without limitation, this can include the data compression optimizer 126 identifying the laptop 102 as having a data compression ratio that is more than 1 standard deviation from the average compression ratios of the similar client devices in the cluster 202, which also include the tablet 104 and the smartphone 106. In this simplified example, the data compression optimizer 126 identifies an inefficient data compression performance for only a single client device, the laptop 102. However, the data compression optimizer 126 may identify inefficient data compression performances for any collection of client devices that store data to common storage and/or for any number of client devices.

Following the identification of a client device with an inefficient data compression ratio, a data compression recommendation for the client device is output, based on data compression factors corresponding to the client device and the identified relationship between the data compression factors corresponding to the cluster and the data compression ratios corresponding to the cluster, block 510. The system 100 optimizes the inefficient data compression performance of a client. By way of example and without limitation, this can include the data compression optimizer 126 outputting a recommendation for the system administrator for the laptop 102 to use the laptop 102 to store only 1 data type instead of 2 data types, based on the strong correlation between the cluster's number of data types and the cluster's data compression ratios. In this simplified example, the data compression optimizer 126 outputs a recommendation to optimize the data compression performance for only a single client device, the laptop 102. However, the data compression optimizer 126 may output a recommendation to optimize the data compression performance for any collection of client devices that store data to common storage and/or for any number of client devices.

Although FIG. 5 depicts the blocks 502-510 occurring in a specific order, the blocks 502-510 may occur in another order. In other implementations, each of the blocks 502-510 may also be executed in combination with other blocks and/or some blocks may be divided into a different set of blocks.

Figure 6:
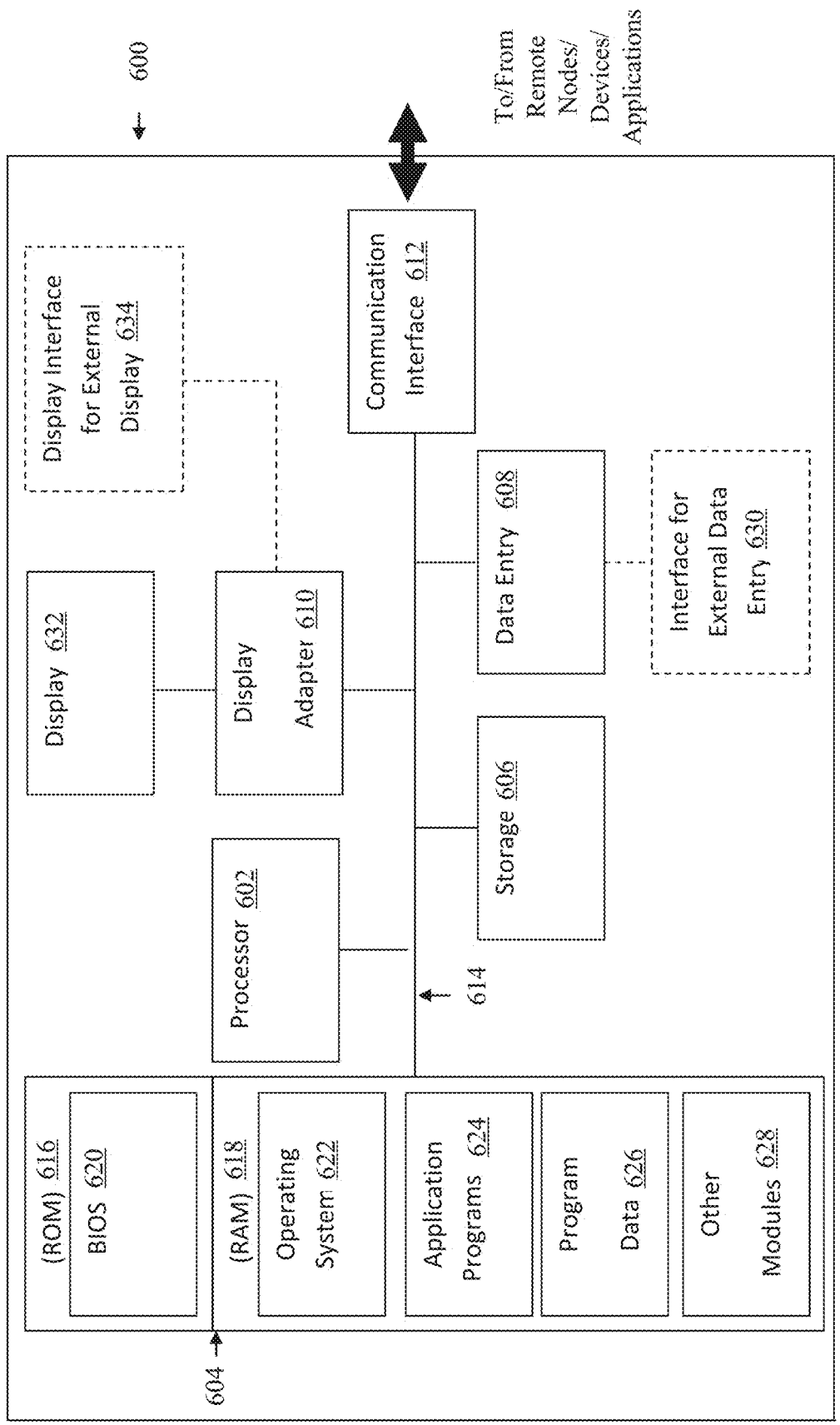
FIG. 6 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 6 may vary depending on the system implementation. With reference to FIG. 6, an exemplary system for implementing the subject matter disclosed herein includes a hardware device 600, including a processing unit 602, memory 604, storage 606, a data entry module 608, a display adapter 610, a communication interface 612, and a bus 614 that couples the elements 604-612 to the processing unit 602.

The bus 614 may comprise any type of bus architecture. Examples include a memory bus, a peripheral bus, a local bus, etc. The processing unit 602 is an instruction execution machine, apparatus, or device and may comprise a microprocessor, a digital signal processor, a graphics processing unit, an application specific integrated circuit (ASIC), a field programmable gate array (FPGA), etc. The processing unit 602 may be configured to execute program instructions stored in the memory 604 and/or the storage 606 and/or received via the data entry module 608.

The memory 604 may include read only memory (ROM) 616 and random access memory (RAM) 618. The memory 604 may be configured to store program instructions and data during operation of the hardware device 600. In various embodiments, the memory 604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 604 may also include nonvolatile memory technologies such as nonvolatile flash RAM (NVRAM) or ROM. In some embodiments, it is contemplated that the memory 604 may include a combination of technologies such as the foregoing, as well as other technologies not specifically mentioned. When the subject matter is implemented in a computer system, a basic input/output system (BIOS) 620, containing the basic routines that help to transfer information between elements within the computer system, such as during start-up, is stored in the ROM 616.

The storage 606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 600.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 606, the ROM 616 or the RAM 618, including an operating system 622, one or more applications programs 624, program data 626, and other program modules 628. A user may enter commands and information into the hardware device 600 through the data entry module 608. The data entry module 608 may include mechanisms such as a keyboard, a touch screen, a pointing device, etc. Other external input devices (not shown) are connected to the hardware device 600 via an external data entry interface 630. By way of example and not limitation, external input devices may include a microphone, joystick, game pad, satellite dish, scanner, or the like. In some embodiments, external input devices may include video or audio input devices such as a video camera, a still camera, etc. The data entry module 608 may be configured to receive input from one or more users of the hardware device 600 and to deliver such input to the processing unit 602 and/or the memory 604 via the bus 614.

A display 632 is also connected to the bus 614 via the display adapter 610. The display 632 may be configured to display output of the hardware device 600 to one or more users. In some embodiments, a given device such as a touch screen, for example, may function as both the data entry module 608 and the display 632. External display devices may also be connected to the bus 614 via an external display interface 634. Other peripheral output devices, not shown, such as speakers and printers, may be connected to the hardware device 600.

The hardware device 600 may operate in a networked environment using logical connections to one or more remote nodes (not shown) via the communication interface 612. The remote node may be another computer, a server, a router, a peer device or other common network node, and typically includes many or all of the elements described above relative to the hardware device 600. The communication interface 612 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 612 may include logic configured to support direct memory access (DMA) transfers between the memory 604 and other devices.

In a networked environment, program modules depicted relative to the hardware device 600, or portions thereof, may be stored in a remote storage device, such as, for example, on a server. It will be appreciated that other hardware and/or software to establish a communications link between the hardware device 600 and other devices may be used.

It should be understood that the arrangement of the hardware device 600 illustrated in FIG. 6 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 600.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 6.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for data compression optimization based on client clusters, the system comprising:
a processor-based application stored on a non-transitory computer-readable medium, which when executed on a computer, will cause one or more processors to:
identify a cluster of similar client devices in a group of client devices, by comparing data compression factors that correspond to each client device in the group of client devices;
identify a relationship between data compression factors corresponding to the cluster and data compression ratios corresponding to the cluster;
identify a client device, in the duster, which corresponds to a data compression ratio that is inefficient relative to other compression ratios corresponding to other client devices in the cluster; and
output a data compression recommendation for the client device, based on data compression factors corresponding to the client device and the identified relationship between the data compression factors corresponding to the cluster and the data compression ratios corresponding to the cluster.

2. The system of claim 1, wherein the processor-based application further causes the one or more processors to identify the data compression factors that correspond to each client device in the group of client devices;
wherein a count of client devices in the cluster of similar client devices is greater than a threshold.

3. The system of claim 1, wherein one of the data compression factors comprises one of an amount of data, a type of data, an age of data, a data compression method, an operating system, a software application, hardware, an enterprise size, a geographical location, and a client/server side of data compression.

4. The system of claim 1, wherein identifying the cluster of similar client devices in the group of client devices comprises applying one of a clustering algorithm and a similarity function to each client device in the group of client devices.

5. The system of claim 1, wherein identifying the relationship between the data compression factors corresponding to the cluster and the data compression ratios corresponding to the cluster comprises one of determining a correlation between one of the data compression factors corresponding to the cluster and the data compression ratios corresponding to the cluster, and generating a regression model based on the data compression factors corresponding to the cluster and the data compression ratios corresponding to the cluster.

6. The system of claim 1, wherein identifying the client device, in the cluster, which corresponds to the data compression ratio that is inefficient relative to the other compression ratios corresponding to the other client devices in the cluster comprises determining an average value and a standard deviation based on the data compression ratios corresponding to the cluster, and identifying the client device which corresponds to the data compression ratio that is a specified amount of the standard deviation from the average value.

7. The system of claim 1, further comprising:
wherein identify a cluster of similar client devices in a group of client devices, by comparing data compression factors that correspond to each client device in the group of client devices further causes the one or more processors to:
identify the cluster of similar client devices based on a similar first storage capacity for one or more types of data available at the similar client devices, wherein the other client devices outside of the cluster correspond with a second storage capacity different than the first storage capacity and different types of data than the one or more types of data in the cluster; and wherein identify a relationship between data compression factors corresponding to the cluster and data compression ratios corresponding to the cluster further causes the one or more processors to:
identify that a correlation exists between a number of types of data stored among all the client devices in the cluster and respective compression ratios of the client devices in the cluster.

8. A computer-implemented method for data compression optimization based on client clusters, the method comprising:
identifying a cluster of similar client devices in a group of client devices, by comparing data compression factors that correspond to each client device in the group of client devices;
identifying a relationship between data compression factors corresponding to the cluster and data compression ratios corresponding to the cluster;
identifying a client device, in the cluster, which corresponds to a data compression ratio that is inefficient relative to other compression ratios corresponding to other client devices in the cluster; and
outputting a data compression recommendation for the client device, based on data compression factors corresponding to the client device and the identified relationship between the data compression factors corresponding to the cluster and the data compression ratios corresponding to the cluster.

9. The method of claim 8, wherein the method further comprises identifying the data compression factors that correspond to each client device in the group of client devices.

10. The method of claim 8, wherein a count of client devices in the cluster of similar client devices is greater than a threshold, and one of the data compression factors comprises one of an amount of data, a type of data, an age of data, a data compression method, an operating system, a software application, hardware, an enterprise size, a geographical location, and a client/server side of data compression.

11. The method of claim 8, wherein identifying the cluster of similar client devices in the group of client devices comprises applying one of a clustering algorithm and a similarity function to each client device in the group of client devices.

12. The method of claim 8, wherein identifying the relationship between the data compression factors corresponding to the cluster and the data compression ratios corresponding to the cluster comprises one of determining a correlation between one of the data compression factors corresponding to the cluster and the data compression ratios corresponding to the cluster, and generating a regression model based on the data compression factors corresponding to the cluster and the data compression ratios corresponding to the cluster.

13. The method of claim 8, wherein identifying the client device, in the cluster, which corresponds to the data compression ratio that is inefficient relative to the other compression ratios corresponding to the other client devices in the cluster comprises determining an average value and a standard deviation based on the data compression ratios corresponding to the cluster, and identifying the client device which corresponds to the data compression ratio that is a specified amount of the standard deviation from the average value.

14. A computer program product, comprising a non-transitory computer-readable medium having a computer-readable program code embodied therein to be executed by one or more processors, the program code including instructions to:
identify a cluster of similar client devices in a group of client devices, by comparing data compression factors that correspond to each client device in the group of client devices;
identify a relationship between data compression factors corresponding to the cluster and data compression ratios corresponding to the cluster;
identify a client device, in the cluster, which corresponds to a data compression ratio that is inefficient relative to other compression ratios corresponding to other client devices in the cluster; and
output a data compression recommendation for the client device, based on data compression factors corresponding to the client device and the identified relationship between the data compression factors corresponding to the cluster and the data compression ratios corresponding to the cluster.

15. The computer program product of claim 14, wherein the program code includes further instructions to identify the data compression factors that correspond to each client device in the group of client devices.

16. The computer program product of claim 14, wherein a count of client devices in the cluster of similar client devices is greater than a threshold.

17. The computer program product of claim 14, wherein one of the data compression factors comprises one of an amount of data, a type of data, an age of data, a data compression method, an operating system, a software application, hardware, an enterprise size, a geographical location, and a client/server side of data compression.

18. The computer program product of claim 14, wherein identifying the cluster of similar client devices in the group of client devices comprises applying one of a clustering algorithm and a similarity function to each client device in the group of client devices.

19. The computer program product of claim 14, wherein identifying the relationship between the data compression factors corresponding to the cluster and the data compression ratios corresponding to the cluster comprises one of determining a correlation between one of the data compression factors corresponding to the cluster and the data compression ratios corresponding to the cluster, and generating a regression model based on the data compression factors corresponding to the cluster and the data compression ratios corresponding to the cluster.

20. The computer program product of claim 14, wherein identifying the client device, in the cluster, which corresponds to the data compression ratio that is inefficient relative to the other compression ratios corresponding to the other client devices in the cluster comprises determining an average value and a standard deviation based on the data compression ratios corresponding to the cluster, and identifying the client device which corresponds to the data compression ratio that is a specified amount of the standard deviation from the average value.

* * * * *